(12) United States Patent
McErlain, II et al.

(10) Patent No.: US 10,871,378 B2
(45) Date of Patent: Dec. 22, 2020

(54) DETECTING CHANGES IN MAP DATA BASED ON DEVICE LOCATION DATA

(71) Applicant: Apple Inc., Cupertino, CA (US)

(72) Inventors: James L McErlain, II, San Leandro, CA (US); Nicholas G Guggemos, Santa Clara, CA (US); Seth E Spielman, Boulder, CO (US)

(73) Assignee: Apple Inc., Cupertino, CA (US)

( * ) Notice: Subject to any disclaimer, the term of this patent is extended or adjusted under 35 U.S.C. 154(b) by 287 days.

(21) Appl. No.: 16/029,433

(22) Filed: Jul. 6, 2018

(65) Prior Publication Data

US 2020/0011684 A1 Jan. 9, 2020

(51) Int. Cl.
*G01C 21/34* (2006.01)
*G01C 21/20* (2006.01)

(52) U.S. Cl.
CPC ......... *G01C 21/3446* (2013.01); *G01C 21/20* (2013.01)

(58) Field of Classification Search
CPC .................................................. G01C 21/3446
See application file for complete search history.

(56) References Cited

U.S. PATENT DOCUMENTS

| | | | | |
|---|---|---|---|---|
| RE38,724 E | * | 4/2005 | Peterson | G01C 21/3461 340/905 |
| 9,582,999 B2 | * | 2/2017 | Lewis | G08G 1/0112 |
| 9,684,081 B2 | * | 6/2017 | Giurgiu | G01S 19/39 |
| 9,697,731 B2 | * | 7/2017 | Bradley | G08G 1/0141 |
| 9,869,559 B2 | * | 1/2018 | Duan | G01C 21/34 |
| 9,903,724 B2 | * | 2/2018 | Duan | G01C 21/30 |
| 9,911,332 B1 | * | 3/2018 | Dorum | G08G 1/143 |
| 2012/0004845 A1 | * | 1/2012 | Kmiecik | G09B 29/10 701/445 |
| 2015/0206426 A1 | * | 7/2015 | Bradley | G08G 1/0141 701/118 |
| 2015/0377629 A1 | * | 12/2015 | Duan | G01C 21/32 701/532 |
| 2017/0074659 A1 | * | 3/2017 | Giurgiu | G01S 19/07 |
| 2018/0364063 A1 | * | 12/2018 | Dorum | G01C 21/3685 |
| 2019/0376795 A1 | * | 12/2019 | Linder | G01C 21/30 |

* cited by examiner

*Primary Examiner* — Alex C Dunn
(74) *Attorney, Agent, or Firm* — Invoke

(57) ABSTRACT

In some implementations, a computing device evaluates map data used by a mapping application to determine whether the map data represents a current road. The computing device gets probe data from mobile devices including probe points representing location and compares probe data against the stored map data (e.g., for the road segment corresponding to the probe points). A vector field is generated across the probe points and road segment to induce directionality. The computing device calculates a normal distance from probe points to the road segment. The computing device calculates map accuracy values from the comparison and normal distance. The values include a vector shift and a cosine similarity value between the stored road segment and the actual road. In some implementations the values are used to conform the map data to the actual road. Road segment data is updated to reflect probe data.

27 Claims, 7 Drawing Sheets

DETECTING CHANGES IN MAP DATA BASED ON DEVICE LOCATION DATA

TECHNICAL FIELD

The disclosure generally relates to map data analysis and map data quality verification.

BACKGROUND

Many users of mobile devices use software-based mapping applications executing on the mobile device to navigate the physical world. For example, mobile device users may often use a mapping application to get driving directions from a starting point to a destination. A mapping application often generates a virtual representation of a physical location or geographic area when providing navigation instructions to the user. Such a virtual representation or display is generated using a large amount of map data relating to and/or representing, for example, roads, speed limits, lanes, points of interest, landmarks, buildings, or the like.

Over time, the real world may change, and the map data may no longer accurately represent the real world. For example, a road may undergo construction and be reconfigured such that its physical state deviates considerably from its representation in the map data. Detecting these changes and/or differences between the map data and the real world can be difficult, burdensome, time consuming, and expensive.

SUMMARY

In some implementations, a computing device can detect changes in map data based on location data from a mobile device. For example, the computing device can receive probe data from mobile devices. The probe data can include probe points representing locations where the mobile devices have traveled, direction, speed, and/or other data. The computing device can compare the probe data against map data for a road segment corresponding to the probe points based on, among other things, direction of travel, speed, and distance between probe points and the road segment. The computing device can calculate map accuracy values (e.g., cosine similarity value, vector shift value, etc.) based on the comparison. In some implementations, the values can be used to conform the map data to the actual road. In some implementations, road segment data can be updated to reflect probe data.

Particular implementations improve map data quality and map product delivery systems. Some implementations enable map product delivery teams to determine whether a map data should be employed as a production data set for use with mapping applications in mobile devices currently in use. The computing device is configured to define map quality thresholds using the values calculated from the probe data. For example, each map data or subset may be compared against the map quality threshold to determine whether a map data should or should not be used in a production map delivery system. Map data that fails to satisfy the map quality thresholds may be reconfigured or decommissioned. Thus, these implementations improve the mapping application user experience and also ensure that only map data meeting a certain standard is deemed safe enough for use by mobile devices being operated in moving vehicles.

Particular implementations also improve additional aspects of the mapping application product as delivered to mapping application users. In some implementations, map data capture teams are dispatched to drive over certain segments to collect map data for use within the map data. The computing device is configured to identify the map data whose road segment representations deviate most significantly (or deviate past a certain threshold) from the actual road. These identified road segments may then be provided to a map data capture system that determines where, when, and how frequently a road segment is to be traversed in order to obtain accurate map data capture.

Particular implementations also improve the current state of the art with respect to computer-based mapping technology. In some implementations, the improvements result in changes to the physical world being detected more quickly. For example, a change in a road's direction, length, contours, or other characteristics may be determined more quickly using these implementations. Particular implementations also enable map product delivery teams to simply determine road changes without having to dispatch map data capture teams to drive over certain road segments. In addition, some implementations result in more accurate maps for end users, leading to fewer navigation routing errors and shorter delays. Moreover, some implementations reduce mapping software errors resulting from incongruities between the actual road and the road as expected or interpreted by the mapping software. This further improves the user experience and leads to greater engagement and usage with the mapping software.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
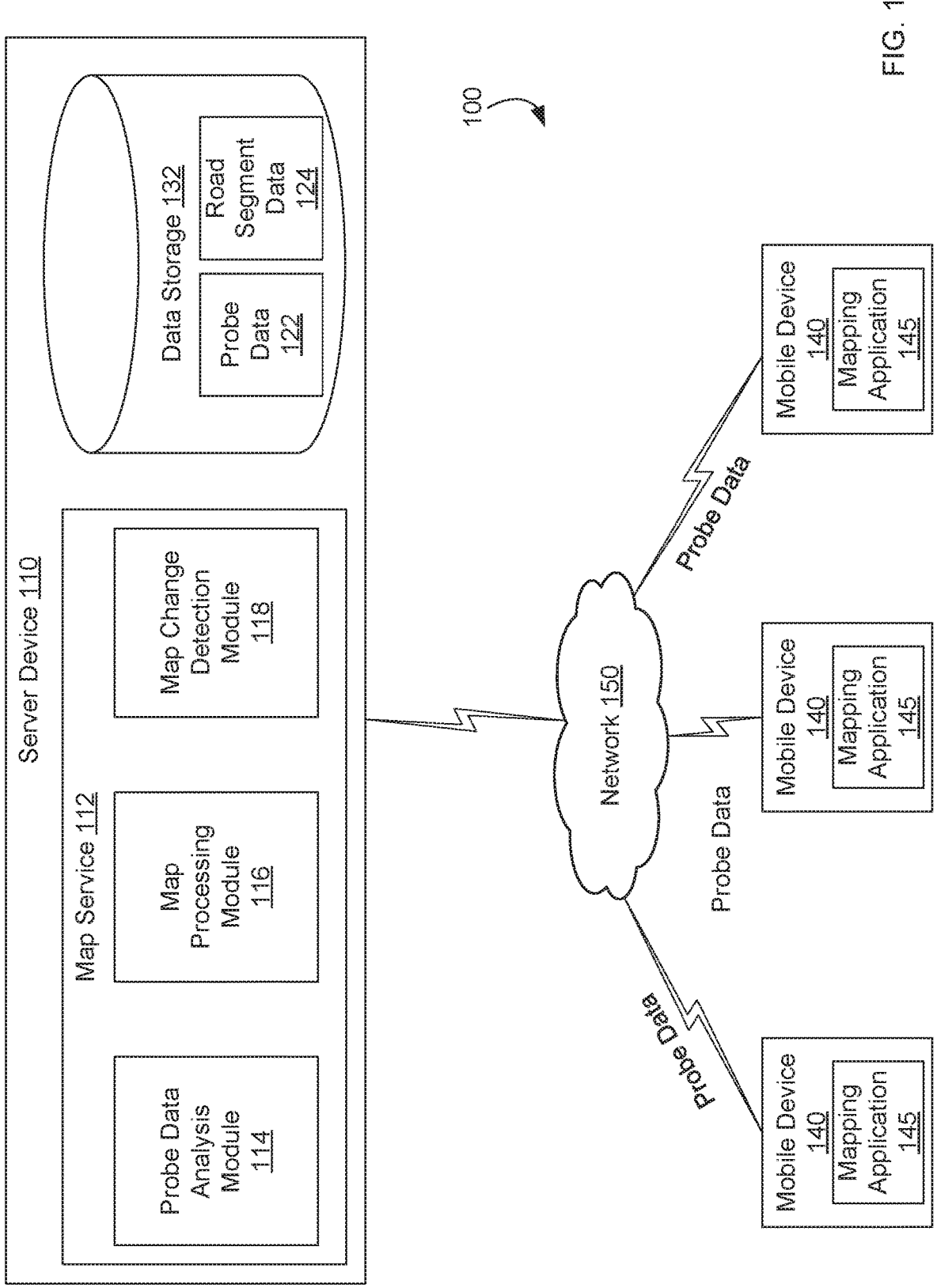
FIG. 1 is a block diagram of an example system for detecting changes in map data based on probe data.

FIG. 1 is a block diagram of an example system 100 for detecting changes in map data based on probe data. For example, system 100 can correspond to a map data verification system that provides a user of server device 110 the ability to analyze, verify, and update map data using probe data received from mobile devices 140 through network 150 (e.g., a local area network, wide area network, the Internet, etc.). Server device 110 may represent a single computing device or multiple computing devices (e.g., as in a computing cluster or distributed computing network). As described in detail below, server device 110 can analyze probe data received from mobile devices 140 and determine a number of values detect differences between the stored map data and the received probe data. System 100 can then identify road segments whose map data is most in need of updating and report such road segments to a map product delivery system for updating. Relatedly, system 100 can also identify whether map data for such road segments should or should not be placed into production map systems by testing such map data against predefined thresholds.

Referring to FIG. 1, in some embodiments, system 100 can include mobile devices 140. For example, mobile device 140 can be a laptop computer, desktop computer, smartphone, tablet computer, wearable device, or any other computing device. A user of mobile device 140 can interact with mobile device 140 to use mapping and navigation functionality. For example, the user may use a software-based mapping application 145 on mobile device 140 to view maps, routes, directions, points of interest, and other navigation options for the user. The mapping application 145 may have a map display, list display, and several other display and interaction controls. The mapping application 145 may display representations of map items (e.g., metadata, images, descriptions, etc.) of map items and enable the user to, for example, get and view driving directions from one location to another.

In some implementations, a computing device can evaluate map data that is used by a mapping application 145 and determine whether the map data accurately represents the current physical state of, for example, a road. The computing device may be, for example, server device 110 that stores and analyzes map data received from multiple external sources (e.g., mobile computing devices 140). The map data may comprise road data relating, for example, to the precise contours and extent of a road segment. Over time, the server device 110 may receive updated map data from various sources and compare the existing map data with the map data received from these sources. The server device 110 uses the results of the comparison to isolate the nature and extent of the deviation between the map data and current observations regarding the road as reflected in the received map data. The server device 110 quantifies this deviation in the form of map data accuracy values.

For example, the server device 110 may receive map data from mobile devices 140. In some implementations, mobile devices 140 send messages to server device 110 that include location data for mobile device 140 at periodic intervals. This location data, also referred to herein as probe data, may be received while mobile device 140 is, for example, inside a vehicle traveling a certain route.

In some embodiments, mobile device 140 is configured to transmit probe data to server device 110 through network 150. The transmitted probe data may be stored as probe data 122 within data storage 132 by server device 110. In some embodiments, mobile device 140 transmits probe data to server device 110 periodically (e.g., every 100 milliseconds). In other embodiments, mobile device 140 transmits probe data to server device 110 in response to particular events. For example, mobile device 140 may transmit probe data to server device 110 in response to a query by server device 110, or any time an application executing on mobile device 140 requests, provides, or otherwise uses location data.

In some embodiments, each mobile device 140 may execute a location module (not shown) that generates location data for applications that execute on mobile device 140. For example, the location module will generate location data for a weather application to provide weather data for the user's particular location. In some embodiments, each application may make location data requests to the location module. In response, the location module determines the location of mobile device 140 and returns it to the requesting application. In other embodiments, the location module can operate without activation by any location data request and may just run as a background application to periodically determine and report locations (e.g., to report probe data to server device 110).

In some embodiments, mobile device 140 can generate probe data and report the probe data to server device 110. Server device 110 can store the probe data (e.g., probe data 122) in data storage 132. For example, probe data can include information describing a mobile device's location, direction, speed, and/or time at which the mobile device's location, direction, and/or speed were determined. When analyzed collectively, multiple instances of probe data may allow server device 110 to trace mobile device positions in space over time.

In some embodiments, the location data in probe data 122 may be embodied as any data indicative of geographic coordinate data, global navigation satellite system data, distance from a fixed point, cardinal direction points, bearing data, angle data, or the like. The speed data in probe data 122 can correspond to the speed at which mobile device 140 is traveling, as determined by the distance traveled and time between location determinations. The direction component of probe data 122 may correspond to a direction calculated using a current probe point and the probe point that was recorded immediately prior to the current probe point. More specifically, a direction may be identified by determining a direction of a directed line or vector drawn from the prior probe point to the current probe point. The time component of the probe data 122 may correspond to a current time reported by, for example, a processor of mobile device 140. Probe data 122 may also be embodied as any data indicative of whether mobile device 140 is/was traveling a requested route. In some embodiments, server device 130 may be configured to not probe certain mobile devices 140 (e.g., unsold devices, devices in the process of being shipped, etc.).

A user of mobile device 140 may travel using, for example, an automobile along a route comprising one or more roads, streets, or highways. As the user travels the route, mobile device 140 can automatically transmit probe data periodically to server device 110 that is received at probe data analysis module 114. In some embodiments, probe data analysis module 114 can be configured to periodically request probe data from mobile device 140. Accordingly, mobile device 140 can receive the probe data request and responds with probe data as is defined above.

Server device 110 collects probe data in at least one of the following two scenarios. In a first scenario, a user possessing a mobile device 140 travels through space (e.g., by walking, driving, sailing, or the like). The user does not request route information (e.g., walking directions or driving directions) from mobile device 140. Server device 110 receives probe data from mobile device 140 and may compare it to map data stored in data storage 132. For example, the user may drive over a road A. Where road A's map data exists within the map data, server device 110 can compare the probe data to the map data for road A and determine any deviations. Or road A's map data may not exist within the map data, prompting server device 110 to identify road A as a road for which map data should be acquired.

In a second scenario, a user requests route information for a route from mobile device 140 and travels the route according to the requested route information, such as driving directions. Server device 110 receives probe data as in the first scenario. However, where the user's path (as denoted by the probe data) deviates from the offered route information, server device 110 determines the extent of the deviation and can use map data accuracy values to improve the map data and any computing logic involved in generating route information. For example, the user's traveled route may indicate a route that is preferable to the route information that server device 110 otherwise offers based on the existing map data.

In some embodiments, data storage 132 can include road segment data 124. More broadly, data storage 132 can include any data that may be indicative of map geometry, road network data, buildings, content about map objects, object names (e.g., road names, building names), or the like. In some embodiments, road segment data 124 may be embodied as any data indicative of geographic coordinate data, Global Positioning Satellite (GPS) data, a set of points defining a line, a mathematical equation that can be used to define a line, real images (e.g., photographs) of physical roads in a particular region, virtual images (e.g., drawings, graphs, lines, etc.) that are virtual representations of the roads, or the like. In some embodiments, road segment data 124 defines one or more roads as a polyline. As used herein, the term 'polyline' refers to a connected sequence of line segments that are created and/or interpreted as a single object. A polyline can include straight line segments, arc segments, or a combination of the two. Road segment data 124 may be expressed as a set of connections and/or subsegments. Road segment data 124 may be expressed in terms of a suitable data structure, such as a directed or undirected graph, a graph database, or the like.

In some embodiments, server device 110 operates a map service 112. For example, the map service 112 may be a software application executing on one or more computer processors of server device 110. In some embodiments, the map service 112 includes a probe data analysis module 114. Probe data analysis module 114 is configured to receive the probe data and prepare the probe data for map verification analysis.

The probe data analysis module 114 receives probe data that includes data for probe points from a mobile device. In some embodiments, the set of probe points represents a traveled route for a mobile device. For example, the set of probe points may represent a traveled route for one of mobile devices 140. In some embodiments, a probe point may be an estimate of a current location of mobile device 140 in space.

In some embodiments, the probe data received from mobile devices 140 is anonymized in order to remove identifying information from the probe data. The anonymization process ensures to remove any data that can be used to identify or track the location of mobile device 140 or a user of mobile device 140. In some embodiments, the anonymization process is completed before the probe data reaches server device 110. In some embodiments, a separate anonymization service (not shown) receives the probe data before it reaches server device 110. The probe data may be associated with an identifier for the probe data, but this identifier cannot be used to identify mobile device 140 or its user. In related embodiments, server device 110 is configured to add dithering data to the probe data so that an unscrupulous viewer of the dithered probe data cannot reverse-engineer a location or path of the user or mobile device 140. In other embodiments, the probe data analysis module 114 is configured to reprocess the probe data received from mobile devices 140 in order to anonymize or otherwise obfuscate the probe data. The reprocessed probe data is then provided to the map processing module 116. In other embodiments, probe data analysis module 114 determines that sufficient noise has been introduced into the probe data from the natural environment so as to make adding dithering data unnecessary.

In some embodiments, the probe data analysis module 114 can be configured to compare probe data to road segments. For example, data analysis module 114 can compare the set of probe points in the probe data (e.g., the probe data 122) to a set of road segments within the road segment data (e.g., the road segment data 124) to detect changes in the road segments. More specifically, the probe data analysis module 114 is configured to identify a road segment that corresponds to the set of probe points. The set of probe points may include millions or even billions of probe points that each represent a three-dimensional position of a mobile device 140 associated with a particular time. In some embodiments, the set of probe points is divided into sub-groups of equal size. For example, each sub-group of the plurality may include the same number of points or each sub-group may correspond to a certain geographical range such as a particular range of geographical coordinates (e.g., latitude and longitude values).

In some embodiments, the probe data analysis module 114 is configured to select a set of probe points (or a subset) and match it to at least one road segment of the set of road segments stored in road segment data 124. For example, probe data analysis module 114 can apply a hidden Markov model algorithm to determine a correspondence between the set of probe points and a particular road segment by identifying the closest road segment to a particular probe point. As another example, probe data analysis module 114 can apply a naïve closest segment algorithm to determine a correspondence between the set of probe points and a particular road segment by identifying the closest road segment to a particular probe point.

In some embodiments, after the probe data analysis module 114 identifies the road segment that is closest to each set of probe points, probe data analysis module 114 can provide the results from the algorithm processing to the map processing module 116. As described above, the probe points may be associated with their closest road segments and these associations are stored by the probe data analysis module 114.

In some embodiments, the probe data analysis module 114 provides a data field or data structure from data storage 132 for each of a set of probe points and road segments to the map processing module 116. For example, the probe data analysis module 114 will associate the corresponding probe points and road segments in a particular data structure (e.g., in an array where the probe points correspond to the array index and the road segment corresponds to the value at that index). The probe data analysis module 114 then may transmit the data structure to the map processing module 116. In other embodiments, the probe data analysis module 114 provides an identifier for each of the set of probe points and road segments to the map processing module 116, and the map processing module 116 is configured to retrieve the appropriate data sets based on the provided identifiers from the data storage 132. For example, the probe data analysis module 114 may store the probe point and road segment data associated with each other in a table and transmit a table identifier to the map processing module 116 for the map processing module 116 to retrieve the table.

In some embodiments, the map processing module 116 is configured to apply a vector field across the set of probe points and the set of road segments. More specifically, the vector field is intended to induce a directionality to each point in the set of probe points. Accordingly, applying the vector field results in each probe point being expressible in terms of a location value, a magnitude value (e.g., a speed) and a directional value In some embodiments, the map processing module 116 is configured to project a vector between the first and last point of a road segment (e.g., one stored as a polyline) to the vector [1,0]. This results in a vector field where the easterly direction is interpreted as a 'positive' direction and a western direction is interpreted as a 'negative' direction for purposes of identifying a directionality for any probe point or road segment point within the vector field. Similarly, a northerly direction is interpreted as a 'positive' direction and a southerly direction is interpreted as a 'negative' direction.

In some embodiments, map processing module 116 is configured to decompose a road segment into road subsegments of equal distance. In some embodiments, map processing module 116 uses a splining algorithm or other interpolation algorithm such as linear interpolation or cubic interpolation algorithm. Consistent splining is used even at points of high curvature on the road segment in order to accurately calculate the signed normal distance from a probe point to its corresponding road subsegment. In other embodiments, a road segment may be decomposed into road subsegments using the road segment's own encoded waypoints. Relatedly, this may be done using a number of point digitization schemes in order to decompose the road segment by waypoint. However, the application of the vector field means that any particular point digitization method used to break down the road segment into subsegment points does not affect the calculation of the signed normal distance. More specifically, regardless of the point digitization method, the signed normal distance can be calculated once the vector field is applied. The value of the signed normal distance calculation may change but this does not affect the overall method of detecting map changes.

In some embodiments, map processing module 116 is configured to select a road subsegment from the set of road subsegments. For the selected road subsegment, the map processing module 116 can be configured to identify the corresponding plurality of probe points. This is done by matching each probe point to the closest road subsegment to the probe point. In some embodiments, the map processing module 116 uses a filtering and/or brute-force matching algorithm to determine the road subsegment that corresponds to each probe point (i.e., the closest road subsegment).

Once the road subsegment closest to each of the set of probe points is identified, the map processing module 116 is configured to identify, in some embodiments, a difference in location (e.g., distance) between a probe point and its corresponding road subsegment. For example, the probe point, corresponding to a location of the mobile device 140 at a certain time, may represent the actual location of the road that mobile device 140 is currently traveling. Consequently, the probe point may provide a more accurate representation of the actual physical location of points on a particular road than the map data. By comparison, the map data corresponding to the road subsegment may not be as accurate a representation of the physical road. A road's contours, extent, width, classification, speed limits, or other characteristics may have changed since the road subsegment data was collected or generated. For example, a road's characteristics may change after construction (e.g., to add a new lane or change an exit ramp's location) that occurred on the road after the road subsegment data was earlier collected. Accordingly, a location difference or distance between the probe point and some correlated point on the road subsegment can be used to determine a degree of deviation between the probe point and the road segment data as stored in data storage 132.

As noted above, server device 110 may compare the probe data against map data. The map data may include data for a road segment. Accordingly, probe data received for the road segment that mobile device 140 is traveling on is compared against data for that road segment stored in the map data. In some implementations, multiple accuracy values are calculated based on the comparison operation. For example, a normal distance may be calculated from a particular probe point to a corresponding road segment. The probe point directionality may then be used to determine a vector shift (or directional shift or angular shift) between the road segment as stored in the map data and the actual road segment as represented by the collection of probe points.

More specifically, the map processing module 116 is configured to determine a distance from the probe point to the road subsegment. In some embodiments, the map processing module 116 is configured to calculate a normal distance to the road subsegment. A normal distance, as used herein, corresponds to the length of a straight line drawn from the probe point to the road subsegment such that the straight line subtends a ninety-degree angle from the road subsegment. It is to be understood that the road subsegment may not be a straight line and may be a curved line similar to many real-world roads. In some embodiments, the road subsegment is divided into sections. Each section is bounded by points, such as by using a splining algorithm. These points may connected by straight lines, or spline lines, for example. The normal line from the probe point is then drawn to the spline line. In other embodiments, a tangent line is drawn at a particular point on the road subsegment that is normal to a particular probe point. A straight line is then drawn from the probe point to the tangent line and the length of this straight line will represent the normal distance.

For example, the normal distance that is calculated may be a signed normal distance. As described above, the map processing module 116 induces a vector field such that each probe point in the set of probe points is interpreted to be in either a 'positive' space or a 'negative' space relative to a road subsegment. Referring back to the characterization of north as 'positive' and south as 'negative', a probe point that is identified to be north of its corresponding road subsegment is interpreted to be a 'positive' distance away from the road subsegment. In other words, the signed normal distance for the probe point will be a positive signed normal distance, and vice versa.

In some embodiments, the map processing module 116 generates a set of signed normal distances that correspond to a road subsegment. The set of signed normal distances is, in some embodiments, used to calculate a mean signed normal distance for each road subsegment. The mean signed normal distance gives a statistical measure of the deviation between the stored data for the road subsegment and the set of probe points. The map processing module 116 provides the mean signed normal distance to the map change detection module 118.

In some embodiments, the map change detection module 118 is configured to generate a number of map data accuracy values using the mean signed normal distances for each road subsegment. In some embodiments, the map change detection module 118 is configured to calculate a shift vector for the road subsegment that provides an indication of how far the road segment, or subsegment, map data deviates from the real world locations corresponding to the probe data. As used herein, a shift vector (or vector shift value) represents a directional deviation between the set of probe points and the road subsegment if the road subsegment is itself interpreted as a collection of points.

In some implementations, server device 110 performs a comparison between the road segment as stored in the map data and a putative road segment as generated using the probe points. Server device 110 generates a distance and a directional deviation between the two road segment representations and uses these values to, for example, generate a new representation of the road segment. More generally, server device 110 is configured to identify road segments for which the distance and directional deviation values exceed certain predefined thresholds. These road segments may then be interpreted as those whose data is most urgently in need of reconfiguration or even replacement.

More specifically, in some embodiments, map change detection module 118 can determine a difference between the probe points and the map data for a road segment based on the point vectors. For example, map change detection module 118 can calculate an average vector for the set of probe points associated with the road subsegment. The map change detection module 118 then calculates a second average vector for the road subsegment points. Subsequently, the map change detection module 118 determines a shift vector between the first average vector and the second average vector. The shift vector gives a measure of deviation between the set of probe points and the road subsegment data. For example, a positive shift vector with a high magnitude indicates that the probe points represent a road that is significantly north of where the data for the road subsegment indicates the road would be.

In some embodiments, the map change detection module 118 is also configured to determine a cosine similarity value as a map data accuracy value. As used herein, a cosine similarity value refers to a cosine value of an angle subtended between two vectors. Accordingly, the map change detection module 118 first calculates an interior angle between two vectors and then calculates a cosine value for the interior angle. A cosine similarity value of 1 (i.e., a cosine of 0°) indicates the highest possible degree of similarity. Similarly, two vectors at 90° will have a cosine similarity value of 0. In some embodiments, the map change detection module 118 calculates a cosine similarity value between the first average vector and the second average vector. In other embodiments, the map change detection module 118 calculates a cosine similarity value between the shift vector and the second average vector.

In some embodiments, the map change detection module can determine whether the map data corresponding to the road segment is accurate. In some embodiments, the map change detection module 118 can be configured with a map error threshold value for map data, verifying map data that is stored in data storage 132. The map error threshold may, for example, correspond to a mean signed distance error threshold for a road subsegment. In other words, a road segment whose mean signed normal distance exceeds the mean signed distance error threshold will fail to satisfy the mean signed distance error threshold. Such a road subsegment may be deemed one whose data stored in data storage 132 (or, specifically, road segment data 124) exceeds acceptable levels of deviation from the actual road that the road subsegment data is supposed to embody.

Similarly, in some embodiments, the map change detection module 118 is configured to test the cosine similarity value for a road subsegment against a cosine similarity threshold value. Where a road subsegment fails the cosine similarity threshold value (e.g., if the road subsegment has a cosine similarity that falls below 0.8), the map change detection module 118 is configured to provide an output value that can be consumed by another system or process to improve map data quality. For example, the map change detection module 118 may provide a cosine similarity threshold failure indicator, or a quantity by which the road subsegment fails the cosine similarity threshold value, or the like.

Similarly, in some embodiments, the map change detection module 118 is configured to test the shift vector values for a road subsegment against a shift vector threshold value. Where a road subsegment fails to satisfy the shift vector threshold value (e.g., if the road subsegment has a shift vector whose magnitude exceeds a certain value), the map change detection module 118 is configured to provide an output value that can be used to, for example, modify stored map data or take other actions to improve map data quality, as described below in further detail. For example, the map change detection module 118 may provide a shift vector threshold failure indicator, or a quantity by which the road subsegment fails the shift vector threshold value, or the like.

In some embodiments, the output values provided by map change detection module 118 are consumed by other systems and/or processors that act to improve map data quality. For example, a map product delivery system may receive the cosine similarity threshold failure values and/or the shift vector threshold failure values and may determine changes to be implemented within map data that is stored in data storage 132. As a specific example, the map product delivery system may determine that road subsegment data for a road subsegment that fails the abovementioned thresholds not be made available to a mapping application 145 provided to users, because the road subsegment data does not accurately reflect the actual road with an acceptable degree of accuracy. In other embodiments, the map product delivery system may be configured to decline to provide a map data file for the road subsegment to a mapping application 145. In other embodiments, output values provided by map change detection module 118 may be implemented into map changes by human operators who determine whether or not map data should be changes according to the output values.

In related embodiments, map change detection module 118 is configured to identify the road subsegment whose data fails to satisfy accuracy thresholds as a candidate road segment for recapture of road data. Map data is often captured by vehicles traveling on roads where the vehicle is equipped with a map data capture application (e.g., a mapping application, GPS device, camera, or the like). The map change detection module 118 is configured to provide these road subsegments to a map product delivery system. The map product delivery system may identify such road subsegments as more urgently in need of road data capture because they fail accuracy thresholds, as described above.

Figure 2:
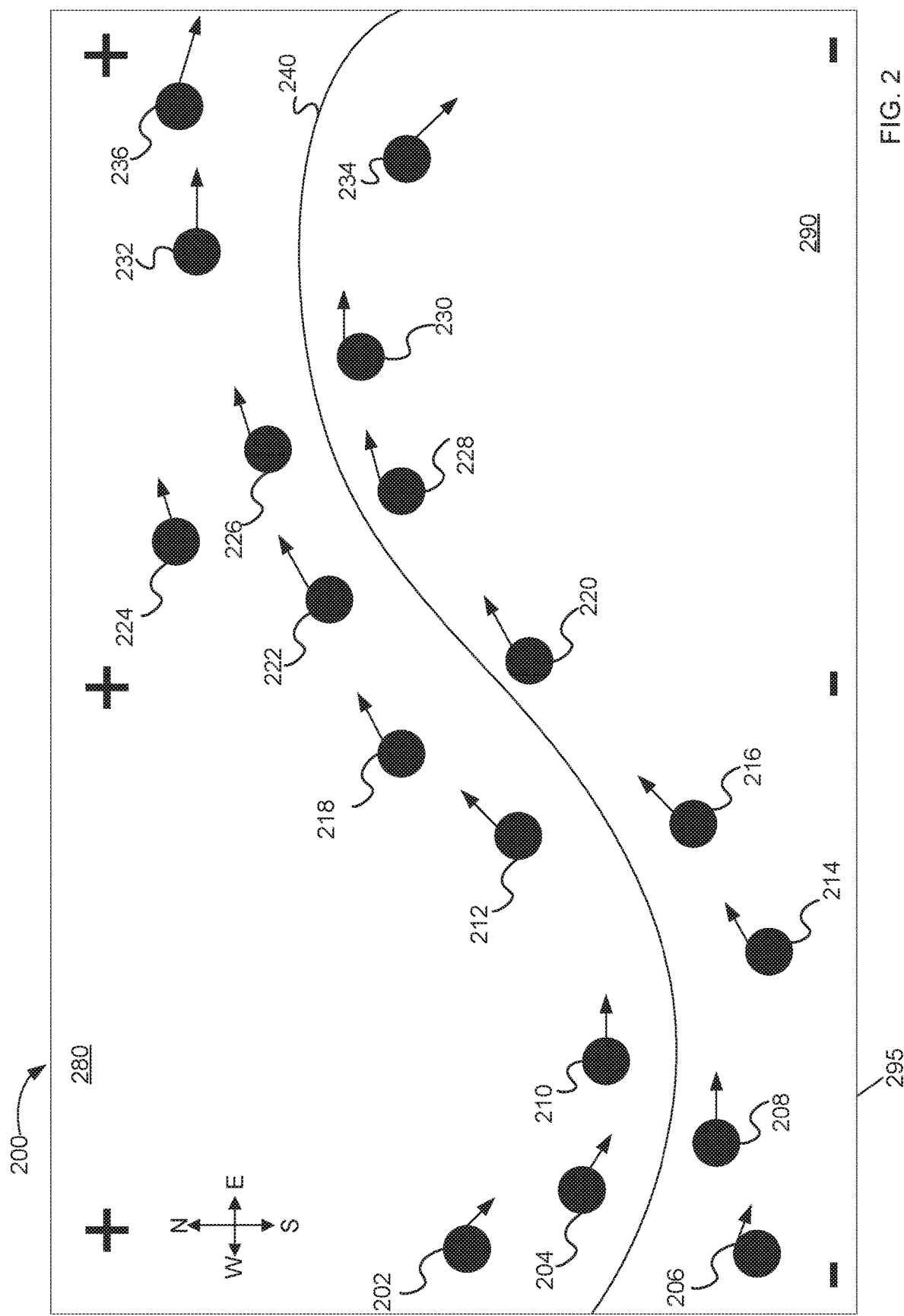
FIG. 2 is a conceptual illustration of probe data associated with a road segment.

FIG. 2 is a conceptual illustration 200 of road segment data from a stored map data in conjunction with probe data as expressed in terms of a road subsegment line and corresponding probe points.

Referring to FIG. 2, in some embodiments, illustration 200 includes probe points 202, 204, 206, 208, 210, 212, 214, 216, 218, 220, 222, 224, 226, 228, 230, 232, 234, and 236. As described above, the map processing module 116 is configured to match the probe points to a particular road subsegment line 240 (e.g., by using a filtering and/or brute-force matching algorithm). FIG. 2 also illustrates the probe points and the road segment 240 after a vector field 295 is induced or generated for the probe points based on the probe data and map data for road segment 240. Accordingly, each of the set of probe points also possesses an induced directionality as shown by the arrows associated with each point.

Additionally, FIG. 2 also shows a 'positive' vector space 280 (indicated by plusses "+" in illustration 200) and a 'negative' vector space 290 (indicated by minuses (−) in illustration 200). As described above, the map processing module 116 is configured to induce a vector field 295 for each probe point of the set of probe points and the road corresponding road segment or subsegment (e.g., road segment 240 shown in FIG. 2). The map processing module 116 is configured to project a vector (1,0) across the first and last points of a road subsegment (or road segment stored as a polyline). The vector projection of the map processing module 116 results in a vector field 295 where the easterly direction is interpreted as a 'positive' direction and a western direction is interpreted as a 'negative' direction for purposes of identifying a directionality for any probe point or road segment point within the vector field 295. Similarly, a northerly direction is interpreted as a 'positive' direction and a southerly direction is interpreted as a 'negative' direction.

As shown in FIG. 2, any probe point in the positive vector space 280 (e.g., 202, 204, 210, 212, 218, 222, 224, 226, 232, and 236) is interpreted as having a positive sign relative to its vector magnitude and any probe point in the negative vector space 290 (e.g., 206, 208, 214, 216, 220, 228, 230, and 234) is interpreted as having a negative sign relative to its vector magnitude. In other embodiments, the map processing module 116 identifies an arbitrary center point on the road segment 240. With respect to the center point, any point corresponding to the road segment 240 that is east of the center point is interpreted as having a positive sign relative to its vector magnitude and any point corresponding to the road segment 240 that is west of the center point is interpreted as having a negative sign relative to its vector magnitude.

Figure 3:
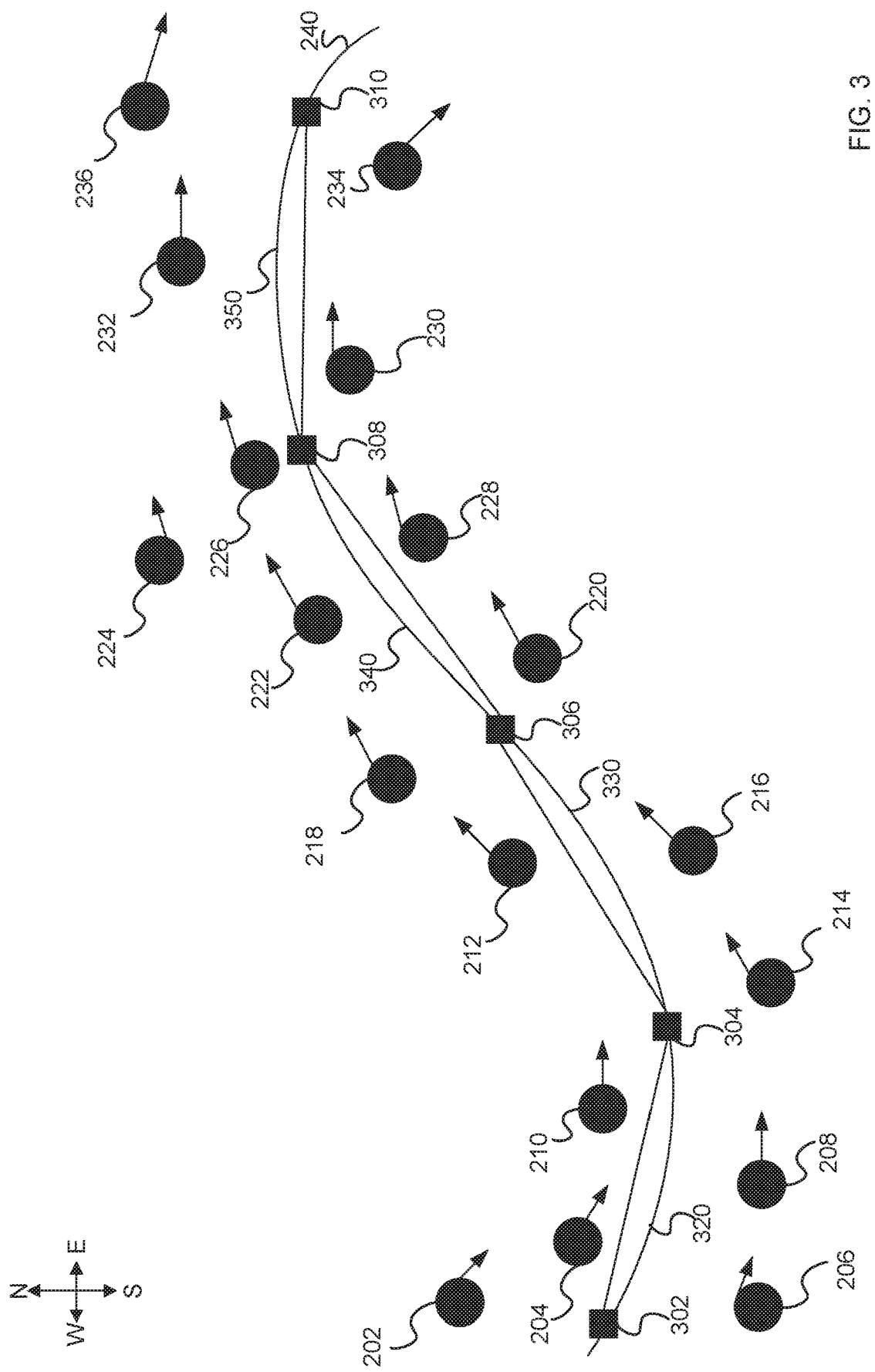
FIG. 3 is a conceptual illustration of decomposing the road segment into subsegments for analyzing the device location data.

FIG. 3 is a conceptual illustration 300 of the road segment data and probe data of FIG. 2, showing the road segment decomposed into road subsegments. Referring to FIG. 3, in some embodiments, the set of probe points 202, 204, 206, 208, 210, 212, 214, 216, 218, 220, 222, 224, 226, 228, 230, 232, 234, and 236 is shown alongside the corresponding road segment 240 as shown in FIG. 2.

In addition, the map processing module 116 is configured to decompose road segment 240 into road subsegments. In some embodiments, the map processing module 116 is configured to generate road subsegments using a linear interpolation algorithm that uses, for example, linear polynomial functions to identify additional data points within the range of a discrete set of road segment points (e.g., the starting point and end point of the road segment).

In some embodiments, the map processing module 116 applies the linear interpolation algorithm by evaluating the road segment 240 as a set of data points and seeks new data points within the range for the road segment 240 in order to evenly divide the road segment 240 into subsegments. Each subsegment is bounded by road subsegment points that are identified using the linear interpolation algorithm. In other embodiments, a cubic interpolation algorithm is used to find interpolant points (i.e., the road subsegment points).

Each subsegment is bounded by subsegment points as shown in FIG. 3. For example, FIG. 3 shows the road segment 240 divided into road subsegments using subsegment points 302, 304, 306, 308, and 310. Accordingly, road subsegment 320 is bounded by subsegments 302 and 304, road subsegment 330 is bounded by subsegments 304 and 306, road subsegment 340 is bounded by subsegments 306 and 308, and road subsegment 350 is bounded by subsegments 308 and 310.

FIG. 3 additionally shows spline lines between each of subsegment points 302, 304, 306, 308, and 310. For example, spline line 395 is shown between subsegment points 308 and 310. The map processing module 116 is configured to process the road segment data for the road segment 240 with a splining algorithm (e.g., by applying a piecewise polynomial function to the road segment data). Splining the road segment 240 results in the map processing module 116 generating spline lines. For example, a spline function may be a piecewise polynomial spline function where each road subsegment point 302, 304, 306, 308, and 310 corresponds to a knot in the spline function. In some embodiments, map processing module 116 is configured to select a uniform spline function where the road subsegment points may be equidistantly distributed. Accordingly, the map processing module 116 generates road subsegments of equal distance.

Figure 4:
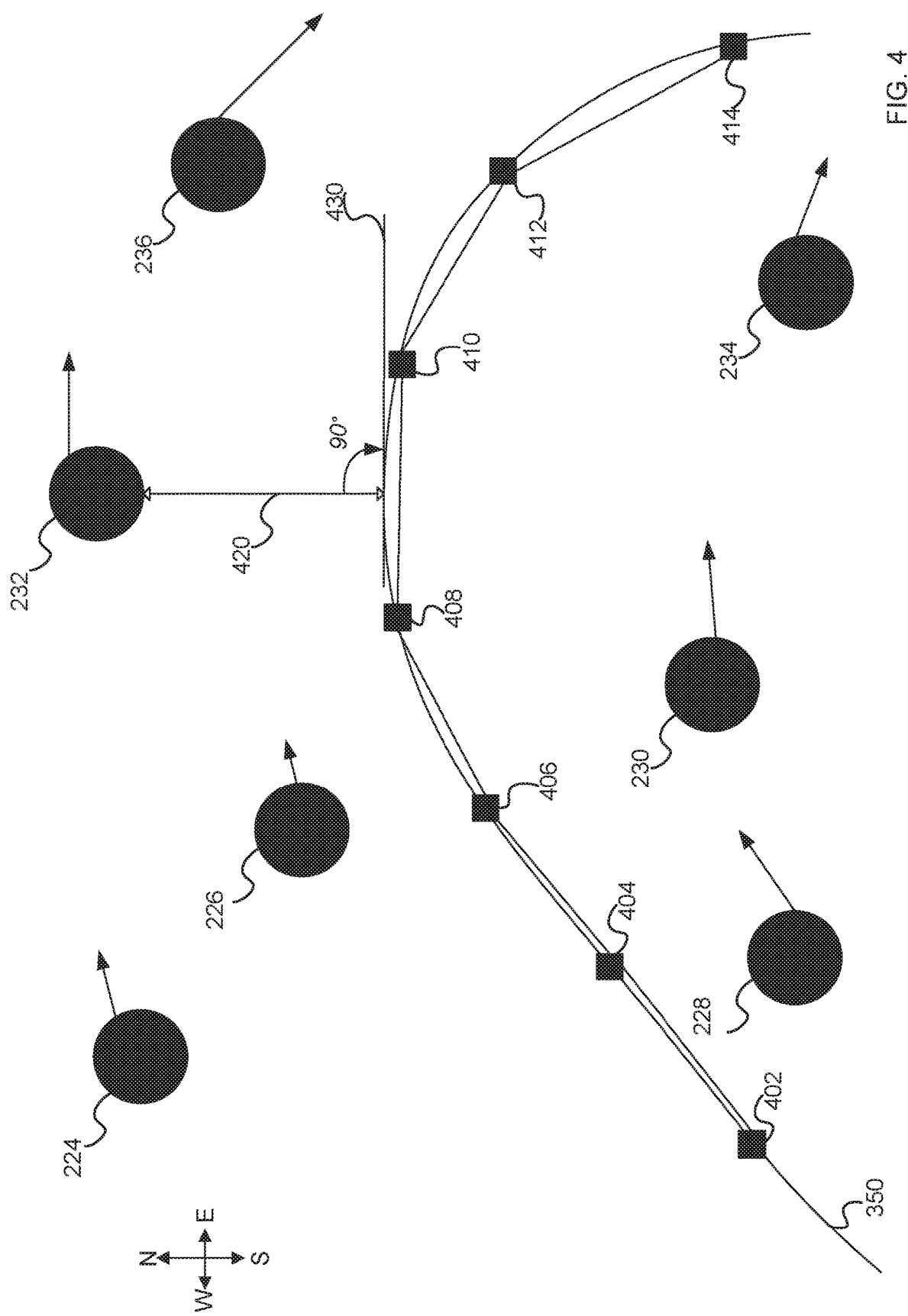
FIG. 4 is a conceptual illustration of how to calculate the distance between a particular reported location and a corresponding road subsegment.

FIG. 4 is a conceptual illustration of a portion of the road segment data and probe data of FIGS. 2 and 3. FIG. 4 shows a signed normal distance calculation for a particular probe point (e.g., probe point 232). Referring to FIG. 4, road subsegment 350 (as shown in FIG. 3) is shown enlarged and the set of probe points that correspond to the road subsegment 350 are also enlarged and shown. Accordingly, probe points 224, 226, 228, 230, 232, and 234 are displayed in FIG. 3. Furthermore, the road subsegment 350 is further subdivided into smaller subsegments bounded by subsegments 402, 404, 406, 410, 412, and 414.

More specifically, the map processing module 116 (shown in FIG. 1) identifies a signed normal distance for probe point 232. In some embodiments, the map processing module 116 first selects a particular probe point such as probe point 232. The map processing module 116 is then configured to identify a pair of road subsegment points nearest to the probe point. As shown in FIG. 4, the road subsegment points lying nearest to the probe point 232 are road subsegment points 408 and 410. The map processing module 116 is configured to then identify a road subsegment bounded by the road subsegment points 408 and 410. As shown in FIG. 4, the map processing module 116 is configured to generate a tangent line 430 for the road subsegment between subsegment points 408 and 410. The tangent line 430 represents the perpendicular line against which the normal distance line 420 for probe point 232 can be drawn. In other embodiments, the normal distance line 420 is drawn to the spline line between points 408 and 410.

Accordingly, the map processing module 116 draws the normal distance line 420 between the probe point 232 and the tangent line 430 such that the normal distance line 420 subtends a ninety-degree angle from the tangent line 430, as shown in FIG. 4. Additionally, since the probe point 232 appears north of the road subsegment 350, the normal distance line is assigned a sign of 'positive.' The map processing module 116 is configured to determine a length of normal distance line 420. Similarly, a signed normal distance may be calculated for each of probe points 224, 226, 228, 230, 234, and 236 relative to road subsegment 350.

Figure 5:
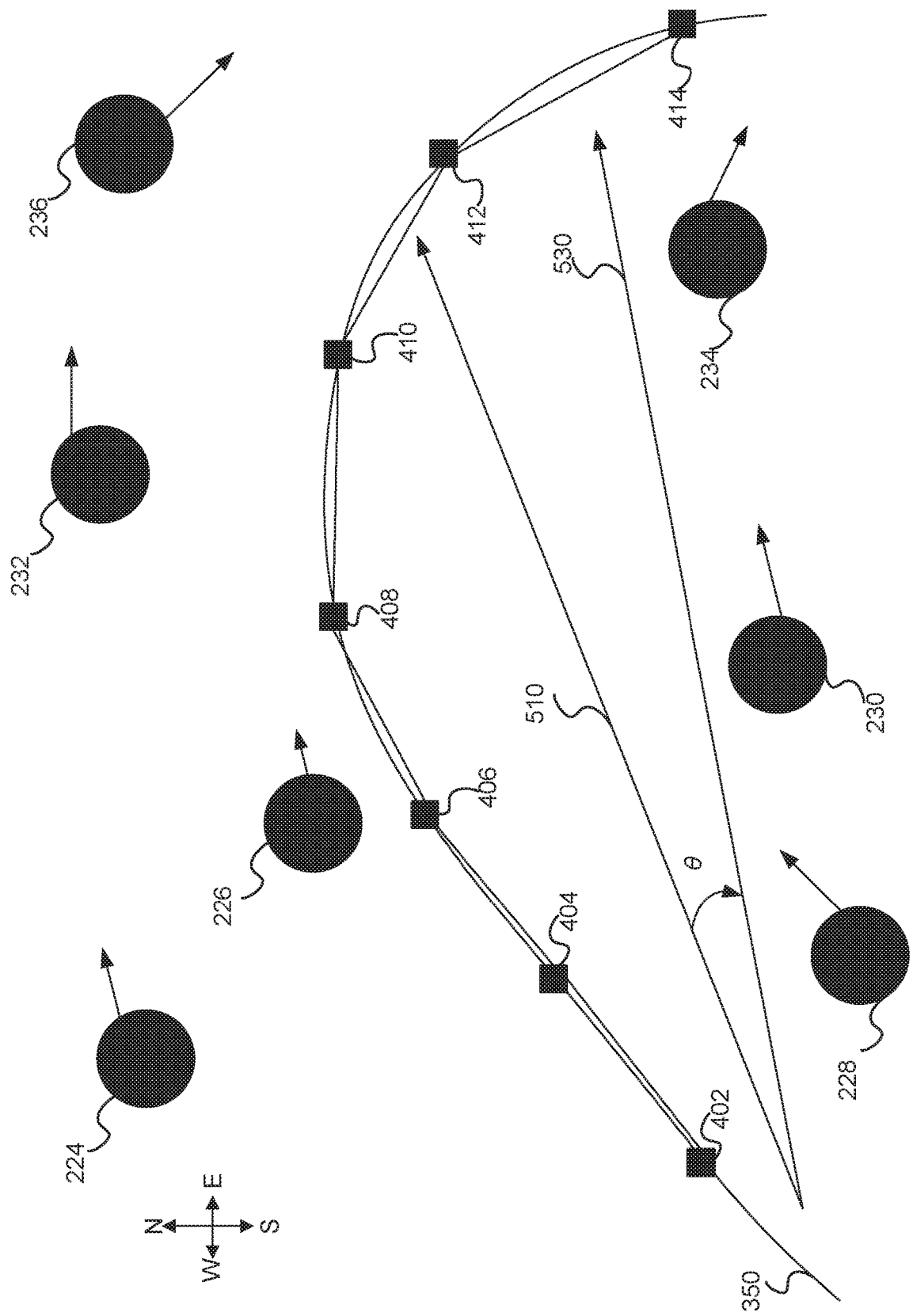
FIG. 5 is a conceptual illustration of how to detect a directional shift for a particular collection of reported locations.

FIG. 5 is a conceptual illustration of a portion of the road segment data and probe data of FIGS. 2 and 3, showing a directional shift calculation for a particular collection of probe points as compared to the stored road segment data.

Referring to FIG. 5, in some embodiments, the map change detection module 118 (shown in FIG. 1) generates a measure of cosine similarity between a first average vector defined by a set of probe points and a second average vector defined by a corresponding road subsegment.

As shown in FIG. 5, map change detection module 118 is configured to generate a first average vector 510 using probe points 224, 226, 228, 230, 232, and 234, and 236. In some embodiments, the map change detection module 118 collates the vector quantities (e.g., magnitude and direction) for each of the probe points 224, 226, 228, 230, 232, and 234, and 236 and determines a total first vector quantity for the probe points. The map change detection module 118 divides the total first vector quantity by the number of probe points (seven in this case) to determine the first average vector 510.

The map change detection module 118 also generates the second average vector 530 using data for the road subsegment 350. In some embodiments, the map change detection module 118 determines vector quantities for each of the subsegment points 402, 404, 406, 408, 410, 412, and 414 and determines a total second vector quantity for the probe points. The map change detection module 118 divides the total second vector quantity by the number of subsegment points (seven in this case) to determine the second average vector 530.

Based on the first average vector 510 for the set of probe points and the second average vector 530 for the road subsegment, the map change detection module 118 determines an interior angle between the first average vector 510 and the second average vector 530. The map change detection module 118 is configured to determine a cosine value of this interior angle (shown as θ in FIG. 5). Based on the cosine value, the map change detection module 118 is configured to assign a cosine similarity value to the road subsegment 350. A cosine of 0 radians (or 0° (degrees)) equals 1. Therefore, a cosine value of 1 for the road subsegment 350 indicates maximum similarity. In other words, there is no measurable deviation between the first average vector 510 for the set of probe points and the second average vector for the road segment 350. For example, this indicates that, within the margin of error, the road segment 350 is congruent with the actual road as represented by the set of probe points.

Similarly, a cosine of 2π radians (or 180° (degrees)) equals −1. This cosine value of −1 for the road subsegment 350 will also indicate maximum similarity. As described earlier, the application of the vector field 295 (as shown in FIG. 2) makes the road subsegment points independent of any other point digitization scheme used to decompose the road. For example, a bidirectional road segment may have been digitized in an east-west direction or a west-east direction. However, this digitization does not affect the cosine similarity calculation. Even if the probe points indicate a mobile device 140 traveling in the opposite direction from which the road segment was digitized, the vector field 295 as applied in FIG. 2 makes the road subsegment independent of its digitization. Accordingly, a cosine value of −1 indicates an equivalent maximum similarity as a cosine value of 1. In other words, there is no measurable deviation between the first average vector 510 for the set of probe points and the second average vector for the road segment 350. For example, this indicates that, within the margin of error, the road segment 350 is congruent with the actual road as represented by the set of probe points.

Also, a cosine of π/2 radians (or 90° (degrees)) equals 0. Accordingly, the map change detection module 118 interprets a cosine value of 0 as the average vectors being perpendicular to each other, indicating a minimum similarity. In other words, there is maximum measurable deviation between the first average vector 510 for the set of probe points and the second average vector for the road segment 350. For example, this indicates that, within the margin of error, the road segment 350 is apparently perpendicular to the actual road as represented by the set of probe points.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 6:
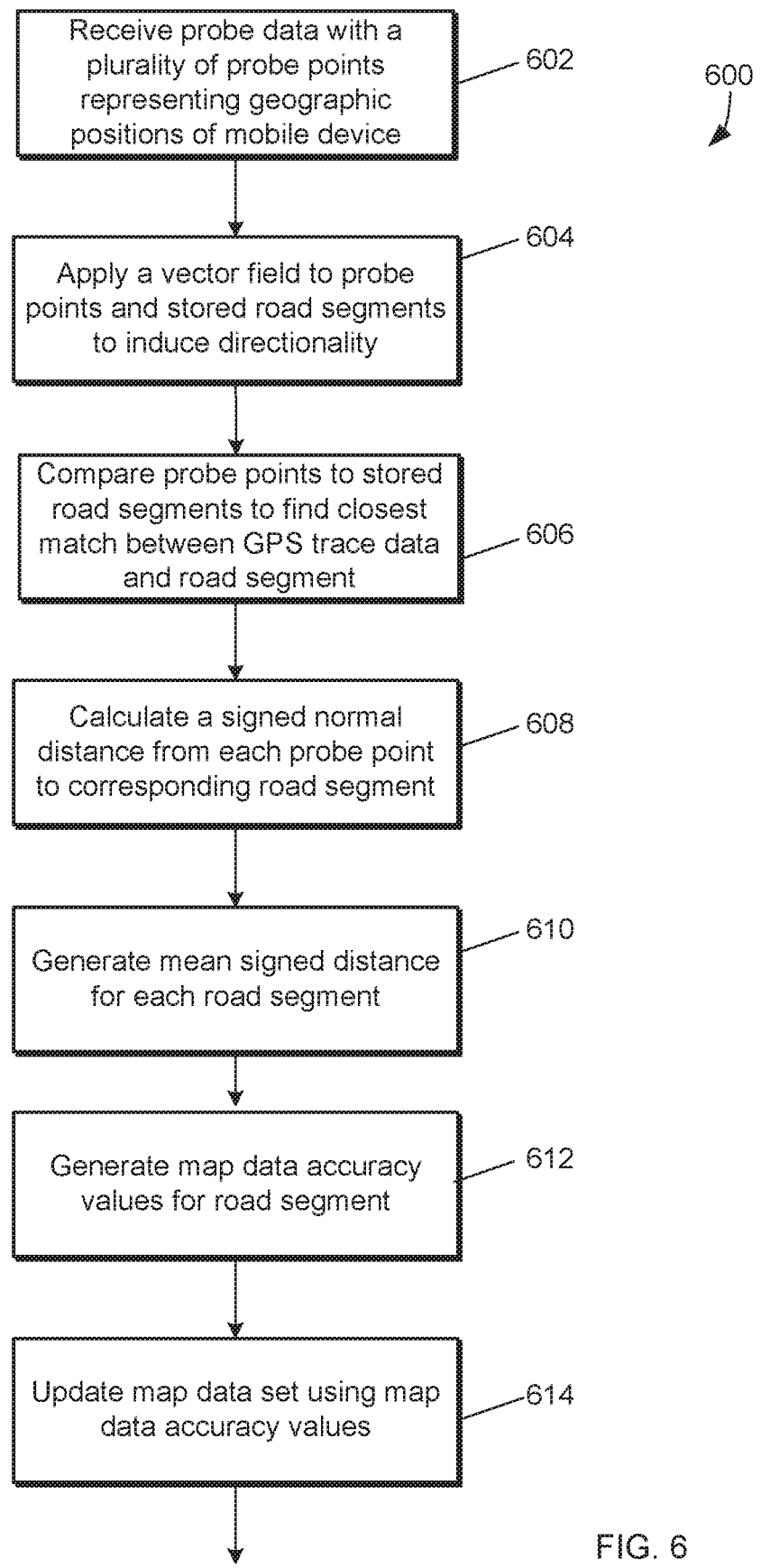
FIG. 6 is flow diagram of an example process for detecting changes in map data based on device location.

FIG. 6 is a flow diagram of an example process for map data quality verification using probe data. For example, process 600 can be performed by a computing device (e.g., server device 110) to generate map data accuracy values. By generating these map data accuracy values (e.g., a mean signed distance, a cosine similarity value, a shift vector quantity), the computing device can identify the degree to which each road segment deviates from its actual, physical road counterpart.

At step 602, the computing device receives probe data with a set of probe points representing geographic positions of mobile device. For example, server device 110 may receive, from mobile devices 140 (shown in FIG. 1), data for a set of probe points. Each probe point represents a position in three-dimensional space and time for a mobile device 140. As described above, a mobile device 140 may periodically transmit probe data indicating the position of mobile device 140 to the server device 110 (e.g., on request by server device 110 or during a periodic automatic transmission to server device 110).

A probe data analysis module 114 of server device 110 removes identifying information from the probe data received from the mobile devices 140. For example, the probe data analysis module 114 first processes the data with an anonymization application or calls an anonymization service to remove identification data or make identification data unusable or inaccessible. The anonymization process ensures to remove any data that can be used to identify or track the location of mobile device 140 or a user of mobile device 140.

At step 604, the computing device applies a vector field to the set of probe points from the received probe data. For example, a map processing module 116 of server device 110 (shown in FIG. 1) applies a vector field to the set of probe points received with the probe data. In addition, the computing device applies the vector field to stored data for road segments corresponding to the set of probe points. The vector field causes a directionality to be induced to each probe point and road segment point. As noted above, road segment data may define a number of roads as a polyline.

The computing device projects a vector between the first and last point of a road segment (e.g., one stored as a polyline) to the vector [1,0]. This results in a vector field where the easterly direction is interpreted as a 'positive' direction and a western direction is interpreted as a 'negative' direction for purposes of identifying a directionality for any probe point or road segment point within the vector field. Similarly, a northerly direction is interpreted as a 'positive' direction and a southerly direction is interpreted as a 'negative' direction.

At step 606, the computing device compares the received plurality of probe points to stored road segment data. The computing device is configured to identify a closest match between the probe points and one of the stored road segments. The set of probe points may be divided into subgroups, each corresponding to a specific range of geographic coordinates.

At step 608, the computing device calculates a signed normal distance from each probe point to corresponding road segment. The signed normal distance represents a difference in location between a probe point and its corresponding road subsegment.

In some embodiments, the computing device selects a probe point and identifies a pair of road subsegment points closest to the probe point. The computing device then identifies a road subsegment bounded by the pair of road subsegment points. The computing device generates a tangent line for the road subsegment between the identified subsegment points so that a line perpendicular to the tangent line may be drawn from the probe point. In other embodiments, the computing device creates a spline line between the road subsegment points and generates the normal line from the probe point to the spline line.

At step 610, the computing device generates a mean signed normal distance for each road segment. More particularly, the signed normal distance for each probe point corresponding to the road segment is combined. Since each probe point includes a positive or negative sign value, the total signed normal distance may be less than a sum of all the normal distances. The total signed normal distance is then divided by the number of probe points in order to determine the mean signed normal distance.

At step 612, the computing device generates a number of map data accuracy values for the road segment. For example, the computing device generates a shift vector and a cosine similarity value for the road segment. As indicated above, a large shift vector indicates a high degree of deviation between the road segment and the actual road it is intended to represent, and vice versa. A high cosine similarity value indicates a low degree of deviation between the road segment and the actual road it is intended to represent, and vice versa.

At step 614, the computing device causes or otherwise identifies a required update to the map data using mean signed distance and shift vector. For example, the computing device recommends that road subsegment data for such a road subsegment not be made available to a mapping application 145, or the computing device updates the map data in light of the map data accuracy values. Additionally, the computing device may identify one or more road subsegments as candidate road segment for recapture of road data in view of a determination that these road segments bear a high degree of deviation from their corresponding physical roads.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources detect where map data ought to be changed in response to probe data received from mobile devices. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to detect map data sections that require update following a change to the real world that the map data is intended to represent. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of probe data being reported by mobile devices, the present technology can be configured to allow users to select to "opt in" or "opt out" of participation in the collection of personal information data during registration for services or anytime thereafter. In another example, users may allow probe data reporting but 'opt in' or 'opt out' of participation in the use of the probe data to detect map data changes. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods. Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, probe data may be reported based on non-personal information data or a bare minimum amount of personal information, such as the content being requested by the device associated with a user, other non-personal information available to the map data change detection system, or publicly available information.

Example System Architecture

Figure 7:
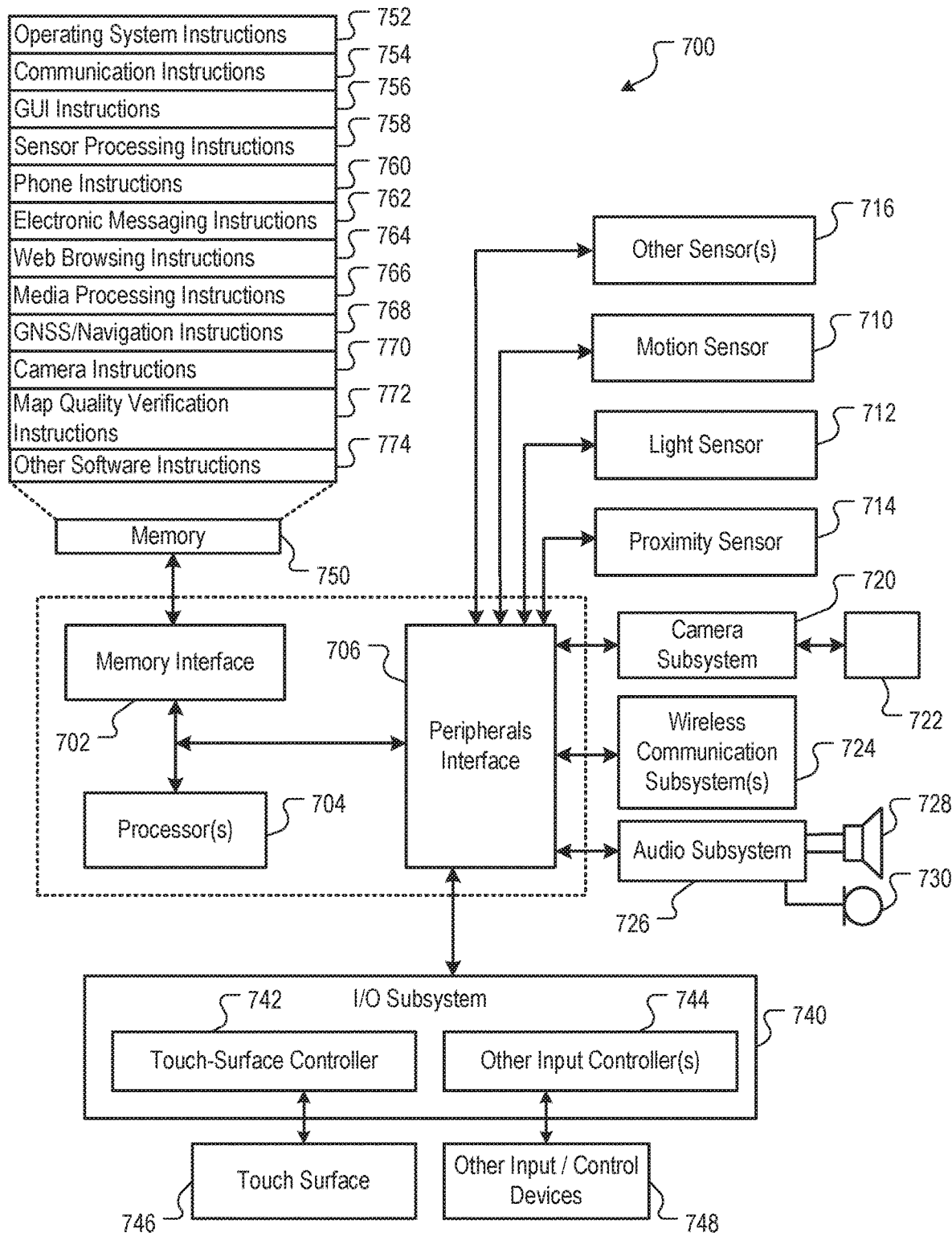
FIG. 7 is a block diagram of an example computing device that can implement the features and processes of FIGS. 1-6.

FIG. 7 is a block diagram of an example computing device 700 that can implement the features and processes of FIGS. 1-6. The computing device 700 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the computing device 700 can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate orientation, lighting, and proximity functions. Other sensors 716 can also be connected to the peripherals interface 706, such as a global navigation satellite system (GNSS) (e.g., GPS receiver), a temperature sensor, a biometric sensor, magnetometer or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips. The camera subsystem 720 and the optical sensor 722 can be used to collect images of a user to be used during authentication of a user, e.g., by performing facial recognition analysis.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the computing device 700 is intended to operate. For example, the computing device 700 can include communication subsystems 724 designed to operate over a GSM network, a GPRS network, an EDGE network, a Wi-Fi or WiMax network, and a Bluetooth™ network. In particular, the wireless communication subsystems 724 can include hosting protocols such that the device 100 can be configured as a base station for other wireless devices.

An audio subsystem 726 can be coupled to a speaker 728 and a microphone 730 to facilitate voice-enabled functions, such as speaker recognition, voice replication, digital recording, and telephony functions. The audio subsystem 726 can be configured to facilitate processing voice commands, voiceprinting and voice authentication, for example.

The I/O subsystem 740 can include a touch-surface controller 742 and/or other input controller(s) 744. The touch-surface controller 742 can be coupled to a touch surface 746. The touch surface 746 and touch-surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration can disengage a lock of the touch surface 746; and a pressing of the button for a second duration that is longer than the first duration can turn power to the computing device 700 on or off. Pressing the button for a third duration can activate a voice control, or voice command, module that enables the user to speak commands into the microphone 730 to cause the device to execute the spoken command. The user can customize a functionality of one or more of the buttons. The touch surface 746 can, for example, also be used to implement virtual or soft buttons and/or a keyboard.

In some implementations, the computing device 700 can present recorded audio and/or video files, such as MP3, AAC, and MPEG files. In some implementations, the computing device 700 can include the functionality of an MP3 player, such as an iPod™.

The memory interface 702 can be coupled to memory 750. The memory 750 can include high-speed random-access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks.

The operating system 752 can include instructions for handling basic system services and for performing hardware dependent tasks. In some implementations, the operating system 752 can be a kernel (e.g., UNIX kernel). In some implementations, the operating system 752 can include instructions for performing voice authentication. For example, operating system 752 can implement the map data quality verification features as described with reference to FIGS. 1-6.

The memory 750 can also store communication instructions 754 to facilitate communicating with one or more additional devices, one or more computers and/or one or more servers. The memory 750 can include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS and navigation-related processes and instructions; and/or camera instructions 770 to facilitate camera-related processes and functions.

The memory 750 can store other software instructions 772 to facilitate other processes and functions, such as the map data quality verification processes and functions as described with reference to FIGS. 1-6.

The memory 750 can also store other software instructions 774, such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the computing device 700 can be implemented in hardware and/or in software, including in one or more signal processing and/or application specific integrated circuits.

What is claimed is:

1. A method of evaluating a quality of map data, the method implemented by a computing device that includes one or more processors and a memory device, the computing device being in communication with a mobile device over a computer network, the method comprising:
   receiving, by the computing device, probe data for a plurality of probe points from the mobile device over the computer network, the plurality of probe points representing a traveled route for the mobile device;
   comparing the plurality of probe points to a plurality of road segments, the plurality of road segments stored as part of road segment data within the map data within the memory device;
   identifying, by the computing device, a road segment of the plurality of road segments that corresponds to the plurality of probe points;
   identifying, by the computing device, for each probe point of the plurality of probe points, a degree of deviation from the probe point to the road segment;
   generating, by the computing device, using the degree of deviation, a map data accuracy value; and
   causing the map data to be updated based on the map data accuracy value.

2. The method of claim 1, further comprising:
   decomposing the road segment into a plurality of road subsegments of equal distance using a splining algorithm;
   selecting a road subsegment of the plurality of road subsegments;
   determining that the probe point of the plurality of probe points is closest in distance to the road subsegment, further comprising using at least one of a filtering algorithm and a brute-force matching algorithm; and
   matching the probe point to the road subsegment.

3. The method of claim 1, further comprising:
   identifying a plurality of road segment points along the road segment; and
   applying a vector field to the plurality of probe points and the plurality of road segment points, wherein applying the vector field i) induces a directionality to the plurality of probe points and the plurality of road segment points, and ii) assigns a sign value to each probe point of the plurality of probe points, wherein a positive sign value for a particular probe point of the plurality of probe points corresponds to a positive sign value for a signed normal distance for the particular probe point, and a negative sign value for the particular probe point corresponds to a negative sign value for the signed normal distance for the particular probe point.

4. The method of claim 1, wherein identifying the road segment that corresponds to the plurality of probe points further comprises:
   generating a dithered approximation of the plurality of probe points by applying dithering noise data to the probe data; and
   matching the dithered approximation to at least one road segment of the plurality of road segments by at least one of a hidden Markov model algorithm and a naïve closest segment algorithm.

5. The method of claim 1, further comprising identifying a signed normal distance from the probe point to the road segment, wherein identifying the signed normal distance further comprises:
   calculating a length for a normal line segment drawn between the probe point and the road segment, wherein the normal line segment drawn from the probe point to the road segment subtends a ninety-degree angle from the road segment; and identifying an assigned sign value for the normal line segment, further comprising determining the assigned sign value for the probe point.

6. The method of claim 1, further comprising calculating a shift vector for the road segment, wherein calculating the shift vector further comprises:

determining a first average vector for the plurality of probe points;

decomposing the road segment into a plurality of road subsegments of equal distance using a splining algorithm, wherein decomposing the road segment further comprises assigning a plurality of road subsegment points to the road segment;

determining a second average vector for the plurality of road subsegment points; and calculating the shift vector based on a vector difference between the first average vector and the second average vector.

7. The method of claim 6, further comprising determining a cosine similarity value between the shift vector and the second average vector of the road segment, further comprising:

calculating an interior angle subtended between the shift vector and the second average vector; and calculating a cosine value for the interior angle.

8. The method of claim 1, further comprising:

defining a map error threshold for the map data, wherein the map error threshold defines a mean signed distance error threshold for the road segment for a mean signed distance between the road segment and the plurality of probe points;

determining that the mean signed distance for the road segment fails to satisfy the mean signed distance error threshold; and declining to provide a map data file for the road segment to a mapping application.

9. The method of claim 8, further comprising:

determining that the mean signed distance fails to satisfy the mean signed distance error threshold; and identifying the road segment as a candidate road segment for recapture of road data by a road data capture application for capturing road data, wherein the road data includes geographic location data and visual data for a road segment.

10. A non-transitory computer-readable medium including one or more sequences of instructions for evaluating a quality of map data that, when executed by one or more processors of a computing device that is in communication with a mobile device over a computer network, cause the processors to perform operations comprising:

receiving, by the computing device, probe data for a plurality of probe points from the mobile device over the computer network, the plurality of probe points representing a traveled route for the mobile device;

comparing the plurality of probe points to a plurality of road segments, the plurality of road segments stored as part of road segment data within the map data within the memory device;

identifying, by the computing device, a road segment of the plurality of road segments that corresponds to the plurality of probe points;

identifying, by the computing device, for each probe point of the plurality of probe points, a degree of deviation from the probe point to the road segment;

generating, by the computing device, using the degree of deviation, a map data accuracy value; and causing the map data to be updated based on the map data accuracy value.

11. The non-transitory computer readable medium of claim 10, wherein the instructions cause:

decomposing the road segment into a plurality of road subsegments of equal distance using a splining algorithm;

selecting a road subsegment of the plurality of road subsegments;

determining that the probe point of the plurality of probe points is closest in distance to the road subsegment, further comprising using at least one of a filtering algorithm and a brute-force matching algorithm; and matching the probe point to the road subsegment.

12. The non-transitory computer readable medium of claim 10, wherein the instructions cause:

identifying a plurality of road segment points along the road segment; and applying a vector field to the plurality of probe points and the plurality of road segment points, wherein applying the vector field i) induces a directionality to the plurality of probe points and the plurality of road segment points, and ii) assigns a sign value to each probe point of the plurality of probe points, wherein a positive sign value for a particular probe point of the plurality of probe points corresponds to a positive sign value for a signed normal distance for the particular probe point, and a negative sign value for the particular probe point corresponds to a negative sign value for the signed normal distance for the particular probe point.

13. The non-transitory computer readable medium of claim 10, wherein the instructions cause identifying the road segment that corresponds to the plurality of probe points include instructions that cause:

generating a dithered approximation of the plurality of probe points by applying dithering noise data to the probe data; and matching the dithered approximation to at least one road segment of the plurality of road segments by at least one of a hidden Markov model algorithm and a naïve closest segment algorithm.

14. The non-transitory computer readable medium of claim 10, wherein the instructions further cause identifying a signed normal distance from the probe point to the road segment and wherein the instructions for identifying the signed normal distance further cause:

calculating a length for a normal line segment drawn between the probe point and the road segment, wherein the normal line segment drawn from the probe point to the road segment subtends a ninety-degree angle from the road segment; and identifying an assigned sign value for the normal line segment, further comprising determining the assigned sign value for the probe point.

15. The non-transitory computer readable medium of claim 10, wherein the instructions cause calculating a shift vector for the road segment, and wherein the instructions that cause calculating a shift vector include instructions that cause:

determining a first average vector for the plurality of probe points;

decomposing the road segment into a plurality of road subsegments of equal distance using a splining algorithm, wherein decomposing the road segment further comprises assigning a plurality of road subsegment points to the road segment;

determining a second average vector for the plurality of road subsegment points; and calculating the shift vector based on a vector difference between the first average vector and the second average vector.

16. The non-transitory computer readable medium of claim 15, wherein the instructions cause determining a cosine similarity value between the shift vector and the second average vector of the road segment, and wherein the instructions that cause determining a cosine similarity value include instructions that cause:

calculating an interior angle subtended between the shift vector and the second average vector; and calculating a cosine value for the interior angle.

17. The non-transitory computer readable medium of claim 10, wherein the instructions cause:

defining a map error threshold for the map data, wherein the map error threshold defines a mean signed distance error threshold for the road segment for a mean signed distance between the road segment and the plurality of probe points;

determining that the mean signed distance for the road segment fails to satisfy the mean signed distance error threshold; and declining to provide a map data file for the road segment to a mapping application.

18. The non-transitory computer readable medium of claim 17, wherein the instructions cause:

determining that the mean signed distance fails to satisfy the mean signed distance error threshold; and identifying the road segment as a candidate road segment for recapture of road data by a road data capture application for capturing road data, wherein the road data includes geographic location data and visual data for a road segment.

19. A system comprising:

one or more processors of a computing device that is in communication with a mobile device over a computer network; and a non-transitory computer-readable medium including one or more sequences of instructions for evaluating a quality of map data that, when executed by the one or more processors, cause the processors to perform operations comprising:

receiving, by the computing device, probe data for a plurality of probe points from the mobile device over the computer network, the plurality of probe points representing a traveled route for the mobile device;

comparing the plurality of probe points to a plurality of road segments, the plurality of road segments stored as part of road segment data within the map data within the memory device;

identifying, by the computing device, a road segment of the plurality of road segments that corresponds to the plurality of probe points;

identifying, by the computing device, for each probe point of the plurality of probe points, a degree of deviation from the probe point to the road segment;

generating, by the computing device, using the degree of deviation, a map data accuracy value; and causing the map data to be updated based on the map data accuracy value.

20. The system of claim 19, wherein the instructions cause:

decomposing the road segment into a plurality of road subsegments of equal distance using a splining algorithm;

selecting a road subsegment of the plurality of road subsegments;

determining that the probe point of the plurality of probe points is closest in distance to the road subsegment, further comprising using at least one of a filtering algorithm and a brute-force matching algorithm; and matching the probe point to the road subsegment.

21. The system of claim 19, wherein the instructions cause:

identifying a plurality of road segment points along the road segment; and applying a vector field to the plurality of probe points and the plurality of road segment points, wherein applying the vector field i) induces a directionality to the plurality of probe points and the plurality of road segment points, and ii) assigns a sign value to each probe point of the plurality of probe points, wherein a positive sign value for a particular probe point of the plurality of probe points corresponds to a positive sign value for a signed normal distance for the particular probe point, and a negative sign value for the particular probe point corresponds to a negative sign value for the signed normal distance for the particular probe point.

22. The system of claim 19, wherein the instructions cause identifying the road segment that corresponds to the plurality of probe points and wherein the instructions that cause identifying the road segment include instructions that cause:

generating a dithered approximation of the plurality of probe points by applying dithering noise data to the probe data; and matching the dithered approximation to at least one road segment of the plurality of road segments by at least one of a hidden Markov model algorithm and a naïve closest segment algorithm.

23. The system of claim 19, wherein the instructions further cause identifying a signed normal distance from the probe point to the road segment, and wherein the instructions that cause identifying the signed normal distance include instructions that cause:

calculating a length for a normal line segment drawn between the probe point and the road segment, wherein the normal line segment drawn from the probe point to the road segment subtends a ninety-degree angle from the road segment; and identifying an assigned sign value for the normal line segment, further comprising determining the assigned sign value for the probe point.

24. The system of claim 19, wherein the instructions cause calculating a shift vector for the road segment, and wherein the instructions that cause calculating a shift vector include instructions that cause:

determining a first average vector for the plurality of probe points;

decomposing the road segment into a plurality of road subsegments of equal distance using a splining algorithm, wherein decomposing the road segment further comprises assigning a plurality of road subsegment points to the road segment;

determining a second average vector for the plurality of road subsegment points; and calculating the shift vector based on a vector difference between the first average vector and the second average vector.

25. The system of claim 24, wherein the instructions cause determining a cosine similarity value between the shift vector and the second average vector of the road segment, and wherein the instructions that cause determining a cosine similarity value include instructions that cause:
   calculating an interior angle subtended between the shift vector and the second average vector; and
   calculating a cosine value for the interior angle.

26. The system of claim 19, wherein the instructions cause:
   defining a map error threshold for the map data, wherein the map error threshold defines a mean signed distance error threshold for the road segment for a mean signed distance between the road segment and the plurality of probe points;
   determining that the mean signed distance for the road segment fails to satisfy the mean signed distance error threshold; and
   declining to provide a map data file for the road segment to a mapping application.

27. The system of claim 26, wherein the instructions cause:
   determining that the mean signed distance fails to satisfy the mean signed distance error threshold; and
   identifying the road segment as a candidate road segment for recapture of road data by a road data capture application for capturing road data, wherein the road data includes geographic location data and visual data for a road segment.

\* \* \* \* \*